Oct. 12, 1965  R. S. QUESINBERRY  3,211,013
VALVE CONTROL MECHANISM
Original Filed July 25, 1960  2 Sheets-Sheet 1

ROBERT S. QUESINBERRY
INVENTOR
HUEBNER & WORREL
ATTORNEYS
BY Richard M. Worrel

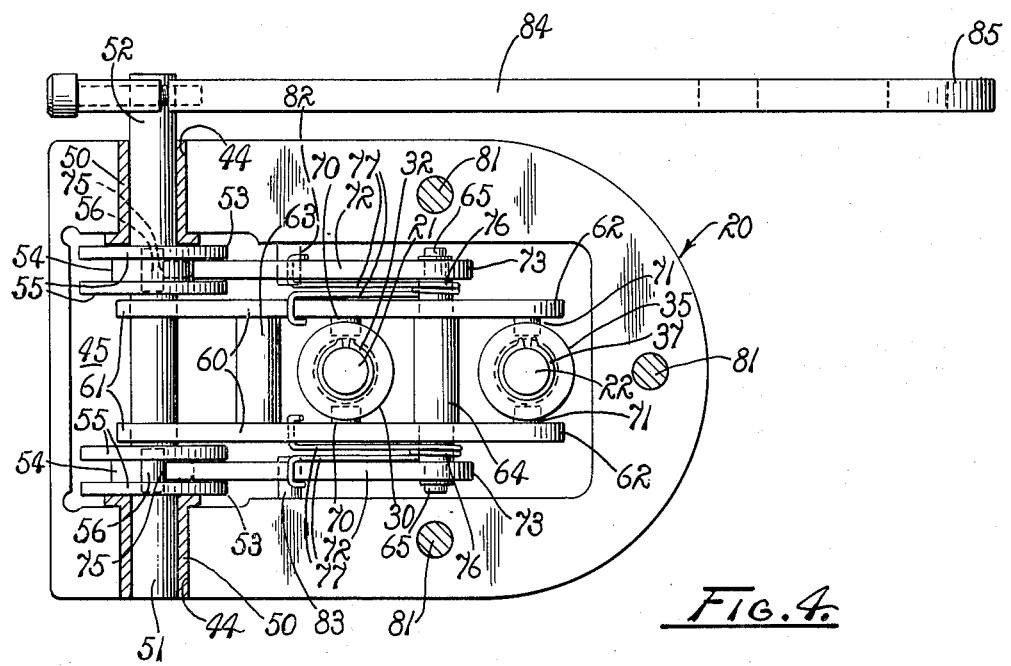

United States Patent Office 3,211,013
Patented Oct. 12, 1965

3,211,013
VALVE CONTROL MECHANISM
Robert S. Quesinberry, Southgate, Calif., assignor, by mesne assignments, to Barton Instrument Corporation, Monterey Park, Calif., a corporation of California
Original application July 25, 1960, Ser. No. 45,076, now Patent No. 3,049,331, dated Aug. 14, 1962. Divided and this application Sept. 19, 1961, Ser. No. 139,160
9 Claims. (Cl. 74—104)

The present application is a division of application Serial No. 45,076, filed July 25, 1960, now Patent No. 3,049,331, issued August 14, 1962, and assigned to Flow Equipment Company by Robert S. Quesinberry as evidenced by the assignment recorded in the United States Patent Office on July 25, 1960, Reel 847, Frames 252 and 253.

This invention relates to an actuating mechanism for a reciprocable member having a limited range of movement and more particularly to an actuator for a plurality of such members wherein the actuator has an extended range of movement and the reciprocable members are controlled within precise limits of movement and with a high degree of sensitivity in response to the actuator movement.

In many environments, rotary movement or reciprocable movement within a given art of travel must be transmitted to one or more reciprocable members which are constrained to rectilinear motion. In such environments, it is desired that the mechanism connecting the actuator and the reciprocable members driven by the actuator be such as to prevent or minimize side loads on the driven members. Side loads induce radial pressures and frictional drag and thereby decrease the sensitivity of the driven members in response to forces transmitted by the actuator. In addition, the reciprocably driven members normally have a limited range of rectilinear movement, whereas the actuator is not so limited. Accordingly, it is also desired that the connecting mechanism permit a relative over-travel of the driven member by the actuator.

An example of such an environment in which those conditions are found is the fluid control mechanism disclosed in the aforementioned patent application Serial No. 45,076. The fluid control valve wherein the pilot or triggering, valve is actuated in response to movement of a float determined by liquid level in a tank. The range of movement of the pilot valve as well as the main float control valve, which is triggered by the pilot valve, is extremely limited, whereas the range of movement of the float and the actuator moved thereby greatly exceeds the limited range of movement of the valves. Accordingly, a mechanism is needed to connect the actuator to the pilot valve, as well as the main valve, which will permit movement of the actuator throughout its extended range without damaging either of the valves. It is also necessary that in the event of such over-travel by the actuator, the actuator will again be effective to control the movement thereof upon subsequent return to a position within the operating range of the valves.

As in all pilot operated valves, there exists the possibility of a malfunction within the pilot valve circuit, so that the main valve fails to respond to movement of the pilot valve. A need has been recognized to provide an actuator mechanism for a pilot-operated valve which includes a mechanical connection between the pilot valve actuator and the main valve which will be effective to control the movements of the main valve in the event of a malfunction in the pilot valve circuit.

Accordingly, it is an object of the present invention to provide an actuating mechanism for one or more reciprocable members having a limited range of movement driven by a single actuator having a range of movement greater than that of the driven members.

Another object is to provide an actuating mechanism for a pair of reciprocable members which achieves a high degree of sensitivity in the members in response to movement by a driving actuator.

Another object is to provide an actuating mechanism adapted for use in controlling a pilot valve and a main valve operated thereby.

Another object is to provide a control mechanism for one or more members driven by an actuator which has a greater range of movement than either of the driven members which permits the actuator to move beyond a predetermined range without structural or functional impairment of the driven members.

A further object is to provide a control mechanism for a pilot valve and a main valve operated thereby which includes a mechanical connection between the pilot valve actuator effective to control movements of the main valve in the event of a failure of the pilot valve.

These, together with other objects, will become more fully apparent upon reference to the following description and accompanying drawings.

In the drawings:

FIG. 4 is a top plan view of the actuating mechanism of FIG. 1 with the cover of the housing removed and portions shown in horizontal section for illustrative convenience.

Figure 1:
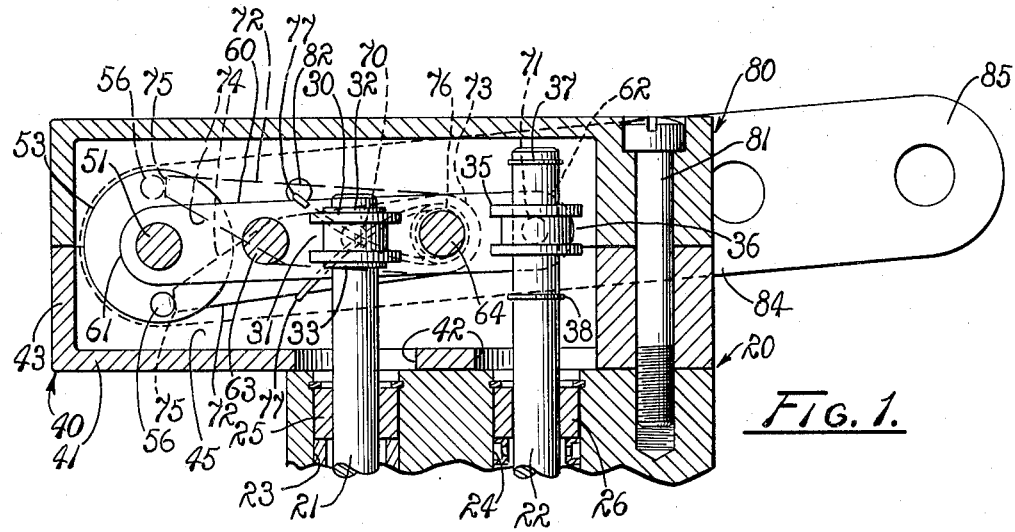
FIG. 1 is a section taken on a vertical plane through an actuating mechanism embodying the principles of the present invention, a portion of a supporting housing being shown fragmentarily, and certain elements being shown in side elevation for illustrative convenience. The mechanism is shown in one of its positions of operation.

Referring to the drawings, a portion of a housing body is illustrated at 20 in which are mounted for a limited range of movement first and second reciprocable members 21 and 22, respectively. As illustrated in the aforementioned patent application, the first member 21 is a trigger or pilot valve supported for rectilinear motion in a cylindrical valve bore, a portion of which is shown at 23. Similarly supported is a main valve constituting the second member 22, disposed within a suitable cylindrical valve bore 24. As in conventional pilot operated valves, the member 22 is provided with a pilot piston, not shown, shiftable alternatively in response to fluid admitted under pressure to alternate sides of the pilot piston, such fluid admission being controlled by the pilot valve 21. Any suitable fluid control circuit for the pilot valve may be used to control the movements of the main valve; an example of a satisfactory pilot circuit is shown in the aforementioned application. Bearings 25 and 26 are disposed within the housing to support the members 21 and 22, respectively for rectilinear motion. Other bearings may be provided in the remaining portion of the housing, not shown, to preclude any departure from the desired rectilinear path.

A crosshead 30 having an annular channel 31 is secured to the pilot valve 21, and a positive motion connection formed therewith by means of upper and lower snap rings 32 and 33 embracing the crosshead. A similar crosshead 35 provided with an annular channel 36 is retained on the main valve 22, and a lost motion connection is provided therewith by upper and lower snap rings 37 and 38 spaced at a distance greater than the axial dimensions of the crosshead 35.

The housing 20 also has an upper portion 40 having a bottom wall 41 against the lower portion of the housing and is provided with openings 42 individually registering with the valve bores 23 and 24. The upper portion also includes a rectangular side wall 43 upwardly extended from the bottom wall and having upwardly disposed bearing notches 44 in axial alignment transversely of the upper portion. The upper portion thus defines an open compartment 45 into which the rods 21 and 22 and crossheads 30 and 35 extend.

Figure 2:
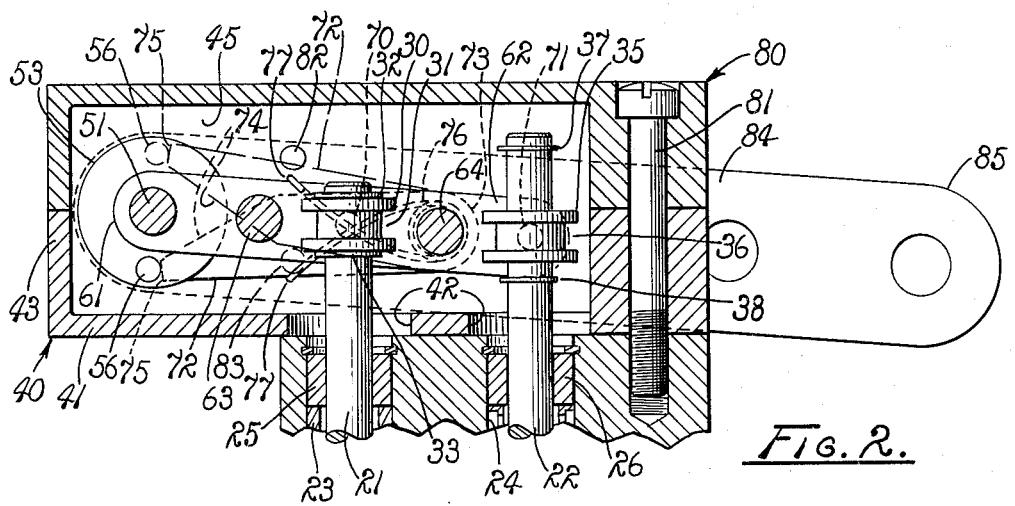
FIG. 2 is similar to FIG. 1 but shows the mechanism in another position of operation.
Figure 3:
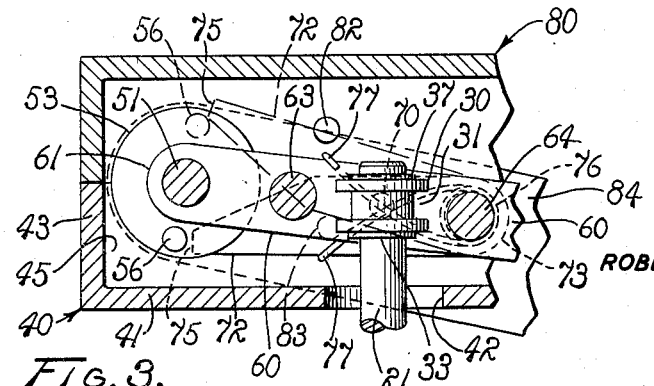
FIG. 3 is a fragmentary view similar to FIG. 2 but shows the mechanism in a position resulting from movement beyond a normal range of operation wherein the actuator has over-traveled the range of movement of the driven members.

Bearings 50 are individually releasably rested in the notches 44 and rotatably journal a rock shaft 51 therein, the latter having an endwardly extended portion 52. Upper and lower limiting, ratchet coupling wheels 53 are secured to the shaft inwardly of the bearings and in axially spaced relation to each other. Each wheel has a hub 54 and a pair of circular, axially spaced discs 55 radially extended from the hub. Upper and lower drive pins or teeth 56 are extended between adjacent discs in radially outwardly spaced relation to the axis of the wheels. As can be seen in FIGS. 1–3, and is indicated in FIG. 4, the two teeth are displaced approximately 180° from each other with respect to the shaft so that when one of the teeth is in an upwardly disposed position, the other tooth is in a downwardly disposed position, and vice versa.

A pair of elongated arms 60 provide inner end portions 61 pivotally supported on the rock shaft 51 inwardly of the ratchet coupling wheels 53. The arms have outer end portions 62 and are held in spaced relation axially of the rock shaft by inner and outer crossbars 63 and 64, the latter having outwardly projected ends 65. The arms are spaced apart by the bars by a distance slightly greater than the outside maximum diameter of the crossheads 30 and 35 and are on opposite sides of said crossheads, as illustrated in FIG. 4. The pilot crosshead is located between the bars while the main crosshead is located outwardly of the outer bar. Inner and outer, axially aligned pairs of trunnions 70 and 71 are inwardly extended from the arms 60 and are respectively received in the channels 31 and 36. It is to be observed that when the arms are elevationally pivoted on the rock shaft 51, the pilot valve 21 is elevationally reciprocated in its bore 23 while, within the limits of the stops 37 and 38, the main crosshead 35 is slid upwardly and downwardly on the main piston rod 22 during said elevational movement of the arms. If the arms are pivoted upwardly or downwardly far enough, the main crosshead engages the stops to lift or lower the main piston rod. It should also be noted that as the arms are moved through their curvilinear path of travel, the trunnions move radially of the valve rods 21 and 22 by sliding in the channels 31 and 36. Accordingly, only rectilinear motion is transmitted to the valve rods.

Elongated, upper and lower limiting pawls 72 provide mounted ends 73 rotatably received on the extended ends 65 of the outer crossbar 64. The pawls are individually disposed in vertical planes respectively passing between the discs 55 of the ratchet coupling wheels 53 on their respective sides of the arms 60. The upper and lower pawls have upwardly and downwardly disposed inner beveled edges 74, respectively, and inner abutment ends 75. Pawl springs have coiled portions around the ends 65 of the outer bar 64 between the arms 60 and the pawls 72. Each spring also has a pair of legs 77 providing hooked ends respectively connected to the arm and pawl adjacent thereto, as best seen in FIG. 4, for urging the beveled edges of the pawls against the hubs 54 of the ratchet coupling wheels 53. In the position of the rock shaft 51, shown in FIGS. 1, 2, and 4, with the teeth 56 upwardly and downwardly disposed, the pawl springs hold the abutment ends of the pawls against the teeth of their respectively adjacent wheels. Therefore, with the beveled edges urged against the hubs and the ends 75 abutting the teeth, the arms 60 are substantially rigidly held in a diametric plane passing through the shaft 51 and equidistantly between the teeth, as illustrated in FIGS. 1 and 2. Thus, the arms move upwardly and downwardly incident to abutment of the teeth with their respective pawls during rocking of the shaft.

The body 20 also includes a cover 80 complementarily fitted over the upper portion 40 and enclosing the structure disposed within the compartment 45 and supported by the upper portion. Elongated screws 81 extend through and releasably retain the cover, the upper portion, and the lower portion of the housing in assembled relation. Upper and lower, pawl engaging, stop pins 82 and 83 are respectively inwardly extended from the side wall 43 of the upper body portion and from the cover into the compartment 45 transversely of and respectively above and below the upper and lower limiting pawls 72. The pawls are engageable with their respective stop pins incident to the above described elevational movement of the pawls upon rotation of the rock shaft 51. When either of the pawls engages its respective stop pin, the stop pin serves as a fulcrum to pivot the pawl thereabout incident to slight further elevational movement of such pawl. The tooth 56 of the corresponding ratchet coupling wheel 53 is thereby disengaged from the abutment end of such pawl as the pawl is pivoted about its respective stop pin, and the tooth is slidably engaged with the beveled edge of the pawl. Accordingly, further elevational movement of such pawl is precluded upon continued rotation of the rock shaft in the same direction once the pawl has been moved out of engagement with its respective drive tooth. Thus, while the ratchet coupling wheels and pawls elevationally move the arms through a predetermined angle, dependent upon the spacing between the pawls and their respective stop pins, the ratchet coupling mechanism releases the arms from the shaft for respective independent movement outside of this angular limit.

With reference to FIG. 4, an elongated lever 84 is adjustably connected to the extended portion 52 of the rock shaft 51 by means of a setscrew. The lever has an outer end 85 which is extended into a tank, not shown, and connected to a buoyant object, or float, which is elevationally adjusted in relation to the liquid level in the tank. The lever 84 may also be operated either manually or mechanically, as an incidence of a controlling member.

*Operation*

The operation of the described embodiment of the subject invention is briefly summarized at this point. As described in the parent application, the subject actuating mechanism is adapted to be employed in a fluid level control. The lever 84 is operated by a float, whose elevational position is determined by the level of liquid in a tank. The actuating mechanism of the current invention is equally well suited to other environments, such as any hydraulically operated servo-mechanism, wherein the lever 84 may be operated manually or in response to movement of any conventional sensing element.

During the following description of operation, it will be assumed that the actuating mechanism is employed in controlling the movements of the pilot valve 21 which controls the flow of operating fluid to the main valve 22. In such an environment, it is necessary that the movement of the pilot valve precede any movement of the main valve, and that any mechanical connection to the main valve permit free movement of the main valve as an incident of admission of pressure fluid to the pilot piston normally associated with such a valve.

It is assumed that the operating lever 84 is in a raised first position, a shown in FIG. 1, and then is moved to a lower second position, as shown in FIG. 2, incident to a decrease of the fluid level to be determined by movement of the main valve. As the operating lever 84 is rotated clockwise, as viewed in the drawings, the shaft 51 along with the ratchet coupling wheels 53 affect rotation of the arms 60. Consequently, both of the crossheads 30 and 35 are moved to a lowered elevational position. Since the crosshead 30 is fixed in relation to the pivot valve 21, this valve immediately responds to the initial movement of the lever 84. By reason of the lost-motion connection between the crosshead 35 and the main valve 22, initial movement of the operating lever 84 does not result in movement of the main valve. Accordingly, as described in the parent application, pilot valve 21 admits operating fluid to the pilot piston, not shown herein, of the main valve 22, and moves it downwardly to a desired valve position. The predetermined spacing between the upper and lower snap rings 37 and 38 permits a range of free movement of the main valve in relation to the actuating mechanism, and the pilot piston limits of movement are fixed to accommodate that range.

As the operating lever 84 is moved between the positions shown in FIGURE 1 and FIGURE 2, the radial position of the trunnion pins with respect to their crossheads 30 and 35 change slightly as a function of the cosine of the angle of movement. However, this slight radial movement of the trunnion pins relative to the crossheads and the valve does not transmit any of the side loads to the pilot and main valves, since the trunnion pins 70 are slidably fitted in the annular channels 31 and 36. Accordingly, the sensitivity of the pilot and main valves is not diminished by the actuating mechanism converting the curvilinear motion to rectilinear motion.

In the event of a failure of the pilot valve fluid pressure circuit, the lost-motion connection, formed by the trunnions and the crosshead 35 slidably mounted on the main valve 22 by means of the snap rings 37 and 38, insures controlled movement of the main valve by the actuating lever 84, after the limits of the lost motion connection have been reached.

In the event of an over-travel by movement of the lever 84 beyond the limits of the pilot and main valves 21 and 22, the ratchet coupling mechanism is effective to release the arms from the shaft 51. Assuming that the lever 84 has been moved to a still further lower position as shown in FIGURE 3, the upper pawl is then engaged by the lower stop pin 83, which then serves as a fulcrum for the pawl. Upon slight further rotational movement of the lever 84 and the hub which carries drive tooth 56 abutting the upper pawl, the upper pawl is pivoted about stop pin 83 to swing the abutment end of that pawl out of the path of its respective drive tooth. The tooth slidably engages the beveled edge 74 of the upper pawl and further elevational movement of that pawl is precluded upon continued rotation of the shaft 51 incident to movement of the lever 84. Upon subsequent return of the lever 84 within the predetermined range of movement illustrated in FIGS. 1 and 2, the spring 76, associated with the upper pawl, then urges the abutment end 75 of that pawl into a position engaging the upper drive tooth 56. Accordingly, the resilient connection is returned to its operative state, and further elevational movement of the lever 84 within the predetermined range is effective to control the positions of the valves 21 and 22.

Therefore, it can be seen that an actuating mechanism has been provided sequentially to control two reciprocable members having a limited range of movement, wherein movement of the control lever 84 causes an immediate response in one of the reciprocable members and a delayed response in the other. Also, the actuating mechanism is effected to disengage the driven members from the control lever upon movement of the control lever beyond the limited range of movement of the driven members.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A control mechanism comprising a support, a driven member mounted in the support for limited reciprocal movement, and a drive member movable through a greater range of movement than the driven member, a shaft journaled in the support, means connecting the shaft to the drive member for rocking of the shaft in opposite directions through a predetermined angle incident to movement of the drive member within the limits of the driven member, arm means rotatably supported on the shaft and radially outwardly extended therefrom, means coupling the arm means to said driven member, and coupling means borne by the arm means and the shaft releasably rigidly connecting the arm means to the shaft while the shaft rocks within said predetermined angle to reciprocate the driven member within its limits of reciprocal movement, and releasing means engageable with said coupling means for releasing the arm means for free rotation on the shaft when the shaft rocks through an angle greater than said predetemined angle outside of said limits of said driven member.

2. The combination of claim 1 wherein said arm means is a pair of elongated arms spaced axially on the shaft, wherein the coupling means includes ratchet coupling wheels concentrically secured to the shaft individually outwardly of the arms; a pair of pawls individually pivotally connected to the arms in radially spaced relation to the shaft and individually in engagement with the wheels adjacent to their respective arms, means resiliently interconnecting the adjacent arms and pawls and yieldably urging the pawls against their respective wheels for respectively releasably connecting the arms to the shaft upon rotation thereof within said predetermined angle; and wherein said releasing means includes a pair of stops mounted on the support with each stop being in a respective one of the paths of movement of the pawls for engagement with the pawls to preclude further movement of the pawls beyond the limits of said predetermined angular rotation of the shaft whereby the arms are released from the shaft.

3. The combination of claim 3 wherein said arm means is a pair of elongated arms spaced axially on the shaft, wherein the coupling means includes wheels having hubs concentrically secured to the shaft individually outwardly of the arms, axially spaced disc radially outwardly extended from the hubs, and lower and upper teeth extended between the discs of the upper and lower limit wheels, respectively, the teeth being in substantially one-hundred eighty degree spaced relation about the shaft; pawls individually pivotally connected to the arms in radially spaced relation to the shaft and individually extended between the discs of the wheels adjacent to their respective arms and respectively on opposite sides of the hubs of such wheels, springs interconnecting the adjacent arms and pawls and yieldably urging the pawls against their respective hubs and into abutment with the adjacent teeth upon rocking of the shaft within said predetermined angle; and wherein said releasing means includes stop pins mounted in the housing in the respective paths of movement of the pawls for engagement with the pawls to preclude further movement of the pawls beyond the limits of said predetermined angular rotation of the shaft whereby the pawls are pivoted away from their respective teeth to permit the teeth to slide under their respective pawls to release the driven member from the shaft.

4. A control mechanism comprising a support; a first driven member mounted in the support for limited reciprocal movement; a second driven member mounted in the support for limited reciprocal movement; a shaft journaled in the support; a control lever mounted on said shaft for rocking the shaft in opposite directions through a greater range of movement than either of said driven members; an arm rotatably supported on the shaft and radially outwardly extended therefrom; a pair of trunnions borne by the arm individually coupling the arm to said first and second driven members; a pawl pivotally mounted on the arm; a pawl engaging member mounted eccentrically on the shaft having a predetermined path of travel concentrically of the shaft incident to rocking of the shaft for engagement with the pawl to pivot the arm about the shaft within said limits of reciprocal movement of the first and second driven members; and a stop mounted in the support engageable with the pawl at said limits of reciprocal movement of the first and second driven members to release the pawl from the engaging member when the shaft movement exceeds said limits.

5. A control mechanism comprising a housing; a first and a second driven member both supported in the housing for a limited range of reciprocal movement; an actuator reciprocably movable through a range of movement greater than said limited range of the driven members; a shaft journaled in the housing; means connecting the shaft to the actuator for rocking of the shaft in opposite directions through a predetermined angle incident to reciprocal movement of the actuator within the limits of the range of movement of the driven members; arm means pivotally supported at one end thereof on the shaft and radially outwardly extended therefrom; a positive-motion connection between said arm means and said first driven member; a lost-motion connection between said arm means and said second driven member; coupling means borne by the arm means and the shaft releasably rigidly connecting the arm means to the shaft while the shaft rotates within said predetermined angle of rotation; and releasing means engageable with said coupling means for releasing the arm means for free rotation relative to the shaft when the shaft rotates through an angle greater than said predetermined angle.

6. A control mechanism comprising a housing; first and second elongated driven members supported in the housing and constrained for limited rectilinear movement; a shaft rotatably supported in the housing; an actuator lever secured to the shaft for rotation thereof in opposite directions through a predetermined angle incident to rectilinear movement of the driven members within the limits of the driven members, the actuator lever having an arcuate path of travel having a range extended beyond said limits; arm means rotatably supported on the shaft and radially outwardly extended therefrom; coupling means releasably rigidly connecting said arm means and the shaft; releasing means to disengage said coupling means upon exceeding a predetermined range of movement of said actuator lever; longitudinally spaced pairs of opposed trunnion pins extended transversely from said arm means; a crosshead fixed to said first driven member, the crosshead being grooved transversely of said member to receive one of said pairs of pins to form a positive-motion connection between the arm means and the first driven member; and a crosshead carried on said second driven member for limited relative movement, the crosshead also being grooved to receive the other of said pairs of pins to form a lost-motion connection between said arm means and said second member, both of said pairs of pins being adapted for sliding movement in their respective grooves as the arm means is rotated to effect rectilinear movement of the driven members so as to move the first driven member in direct response to initial movement of the actuator lever within the limits of movement of the first driven member while delaying the movement of the second driven member in response to movement of the actuator lever until the first member has been moved a predetermined distance.

7. The combination of claim 6 wherein said arm means comprises a pair of elongated arms spaced axially on the shaft, wherein the coupling means includes wheels including hubs concentrically secured to the shaft individually outwardly of the arms, axially spaced discs radially outwardly extended from the hubs, and lower and upper teeth extended between the discs of the upper and lower limit wheels, respectively, the teeth being in substantially one-hundred eighty degree spaced relation about the shaft; pawls individually pivotally connected to the arms in radially spaced relation to the shaft and individually extended between the discs of the wheels adjacent to their respective arms and respectively on opposite sides of the hubs of such wheels, springs interconnecting the adjacent arms and pawls and yieldably urging the pawls against their respective hubs and into abutment with the adjacent teeth upon rotation of the shaft within said predetermined angle; and wherein said releasing means includes stop pins mounted in the housing respectively outwardly and in the paths of movement of the pawls for engagement with the pawls to preclude further movement of the pawls beyond the limits of said predetermined angular rotation of the shaft whereby the pawls are pivoted away from their respective teeth to permit the teeth to slide under their respective pawls to release the driven member from the shaft.

8. A control mechanism comprising a support, a rock shaft journaled in the support, means for selectively rotationally positioning the shaft in the support, an arm pivotally mounted on the shaft and transversely extended therefrom adapted for operative association with means to be controlled, a pawl pivotally mounted on the arm in spaced relation to the shaft and having an end disposed adjacent to the shaft for pivotal movement toward and from the shaft, a pawl engaging member mounted eccentrically on the shaft having a predetermined orbit of travel about the shaft incident to shaft rotation, resilient means interconnecting the arm and the pawl urging the pawl into the orbit of the engaging member whereby the pawl pivots the arm about the shaft incident to engagement of the engaging member with the pawl, and a stop mounted in the support engageable with the pawl at a position of predetermined travel of the arm to release the pawl from the engaging member and to permit continued travel of the engaging member in its orbit independently of the pawl and the arm.

9. A mechanism for controlling an associated device comprising a support, a rock shaft journaled in the support, means for selectively rocking the shaft in the support, an arm pivotally mounted on the shaft and transversely extended therefrom adapted for operative connection to such an associated device, a pair of pawls pivotally mounted on the arm at positions in spaced relation to the shaft having ends disposed adjacent to the shaft and on opposite sides thereof for independent pivotal members individual to the pawls mounted eccentrically of movement toward and from the shaft, pawl engaging the shaft and on opposite sides thereof having predetermined orbits of travel about the shaft incident to rocking of the shaft, resilient means interconnecting the arm and the pawls urging the pawls into the orbits of their respective engaging members whereby rocking of the shaft in either direction brings an engaging member into engagement with its respective pawl and pivots the arm in a corresponding direction, and stops individual to the pawls mounted in the support engageable with their respective pawls to displace them from the orbits of their respective engaging members at predetermined opposite rotational positions of the shaft to release them from their respective engaging members to permit continued travel of the engaging members in their orbits independently of their respective pawls and the arm.

References Cited by the Examiner

UNITED STATES PATENTS

| | | | |
|---|---|---|---|
| 792,411 | 6/05 | Graham et al. | 74—103 |
| 1,080,486 | 12/13 | Sheagren | 74—157 |
| 2,045,045 | 6/36 | Moore | 74—104 X |
| 2,152,551 | 3/39 | Lieb et al. | 74—104 |
| 2,263,924 | 11/41 | Hopkins et al. | 74—157 X |
| 2,588,133 | 3/52 | Lunde | 137—637.1 X |

FOREIGN PATENTS

| | | |
|---|---|---|
| 425,469 | 6/11 | France. |
| 714,837 | 2/44 | Germany. |

BROUGHTON G. DURHAM, *Primary Examiner.*

MILTON KAUFMAN, *Examiner.*